United States Patent
Hanusiak et al.

(10) Patent No.: US 10,762,090 B2
(45) Date of Patent: Sep. 1, 2020

(54) SOFTWARE DISCOVERY BASED ON METADATA ANALYSIS

(71) Applicant: INTERNATIONAL BUSINESS MACHINES CORPORATION, Armonk, NY (US)

(72) Inventors: Tomasz Hanusiak, Cracow (PL); Konrad W. Komnata, Cracow (PL); Jaroslaw Osinski, Mrozy (PL); Grzegorz P. Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 15/871,421

(22) Filed: Jan. 15, 2018

(65) Prior Publication Data
US 2019/0220536 A1     Jul. 18, 2019

(51) Int. Cl.
| | | |
|---|---|---|
| *G06F 17/00* | (2019.01) | |
| *G06F 16/2457* | (2019.01) | |
| *G06F 16/28* | (2019.01) | |
| *G06F 16/23* | (2019.01) | |
| *G06Q 10/00* | (2012.01) | |

(52) U.S. Cl.
CPC .... *G06F 16/24575* (2019.01); *G06F 16/2358* (2019.01); *G06F 16/283* (2019.01); *G06Q 10/00* (2013.01)

(58) Field of Classification Search
CPC ........... G06F 16/24575; G06F 16/2358; G06F 16/283; G06Q 10/00
USPC .................................................. 707/600–899
See application file for complete search history.

(56) References Cited

U.S. PATENT DOCUMENTS

| | | | |
|---|---|---|---|
| 6,662,171 B1 * | 12/2003 | Goertz ................ | G06F 11/2257 706/45 |
| 9,575,979 B1 | 2/2017 | McClintock et al. | |
| 2012/0210423 A1 | 8/2012 | Friedrichs et al. | |
| 2016/0054462 A1 | 2/2016 | Williams et al. | |
| 2016/0299933 A1 | 10/2016 | Fillipi et al. | |

* cited by examiner

*Primary Examiner* — Isaac M Woo
(74) *Attorney, Agent, or Firm* — Dmitry Paskalov

(57) ABSTRACT

A computer implemented method for discovering a software product in a corporate data processing system comprises: connecting a first computer to a knowledge database, the knowledge database comprising at least one software product indicating identifier that is adapted to identify a software product. Subsequently, the first computer may select, from the knowledge database, one of the at least one software product indicating identifiers. Then the first computer may connect to the corporate data processing system. This step is followed by analyzing, by the first computer, the corporate data processing system for an occurrence of the software product indicating identifier in the corporate data processing system. Eventually the first computer may write a result of the step of analyzing to a list of discovered software products.

17 Claims, 3 Drawing Sheets

SOFTWARE DISCOVERY BASED ON METADATA ANALYSIS

BACKGROUND

In a company environment, a large number of systems comprising large amounts of data can be found. Because of the large amount of data, providing information about the knowledge the company has, helps the company to more efficiently use its own knowledge.

The data sources within a company may be, for example, an Enterprise Resource Planning (ERP) database, a Customer Relationship Management (CRM) database, a Manufacturing Execution System (MES) database, some legacy databases, and the filesystem with data files itself, the file system also being denoted as files database, though the file system usually is not a relational database. Many more different databases may be used in a company, based upon its respective specific needs.

The aforementioned databases are usually very specific in nature, because they serve very specific needs of the company. As a result, it is very tedious to get an overview about all data the company has. Methods and processes addressing this problem, in order to provide a base for improving the company's operative or strategic decisions, are summarized under the term of Business Intelligence (BI). Known example results of BI are Online Analytical Processing (OLAP), Data Mining, Data Visualization, or, Reports.

The means for achieving the BI results may be a Corporate Information Factory (CIF), or: a corporate data processing system that comprises a central database that may be termed as Data Warehouse. Further, the CIF may comprise an Extraction Transform Load (ETL) system for receiving the data from all the data sources and transforming it before loading it into the data warehouse. Further, the CIF may comprise one or more Data Marts that receive data from the Data Warehouse upon specific requests, the Data Marts each serving a specific purpose.

In view of the large amount of data and the many different software products processing the data, there may be a need for information about the software products processing all the data.

SUMMARY

Various embodiments provide for a computer implemented method for discovering a software product in a corporate data processing system, a computer program product for discovering a software product in a corporate data processing system, and a software discovering server for discovering a software product in a corporate data processing system. Advantageous embodiments are described in the dependent claims. Embodiments of the present invention can be freely combined with each other if they are not mutually exclusive.

In one aspect, the invention relates to a computer implemented method for discovering a software product in a corporate data processing system, the method comprising: connecting a first computer to a knowledge database, the knowledge database comprising at least one software product indicating identifier that is adapted to identify a software product; selecting, by the first computer, from the knowledge database, one of the at least one software product indicating identifiers; connecting the first computer to the corporate data processing system; analyzing, by the first computer, the corporate data processing system for an occurrence of the software product indicating identifier in the corporate data processing system; writing, by the first computer, a result of the step of analyzing to a list of discovered software products.

In another aspect, the invention relates to a software discovering server for discovering a software product in a corporate data processing system, the software discovering server being established by a first computer and a knowledge database, the software discovering server comprising: means for connecting the first computer to the knowledge database, the knowledge database comprising at least one software product indicating identifier that is adapted to identify a software product; means for selecting, by the first computer, from the knowledge database, one of the at least one software product indicating identifiers; means for connecting the first computer to the corporate data processing system; means for analyzing, by the first computer, the corporate data processing system for an occurrence of the software product indicating identifier in the corporate data processing system; and means for writing, by the first computer, a result of the step of analyzing to a list of discovered software products.

In another aspect, the invention relates to a computer program product for discovering a software product in a corporate data processing system, the computer program comprising: a computer readable storage medium having computer usable code embodied therewith, wherein the computer readable storage medium is not a transitory signal per se, the computer usable program code comprising: computer usable code configured for connecting a first computer to a knowledge database, the knowledge database comprising at least one software product indicating identifier that is adapted to identify a software product; computer usable code configured for selecting, by the first computer, from the knowledge database, one of the at least one software product indicating identifiers; computer usable code configured for connecting the first computer to the corporate data processing system; computer usable code configured for analyzing, by the first computer, the corporate data processing system for an occurrence of the software product indicating identifier in the corporate data processing system; computer usable code configured for writing, by the first computer, a result of the step of analyzing to a list of discovered software products.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
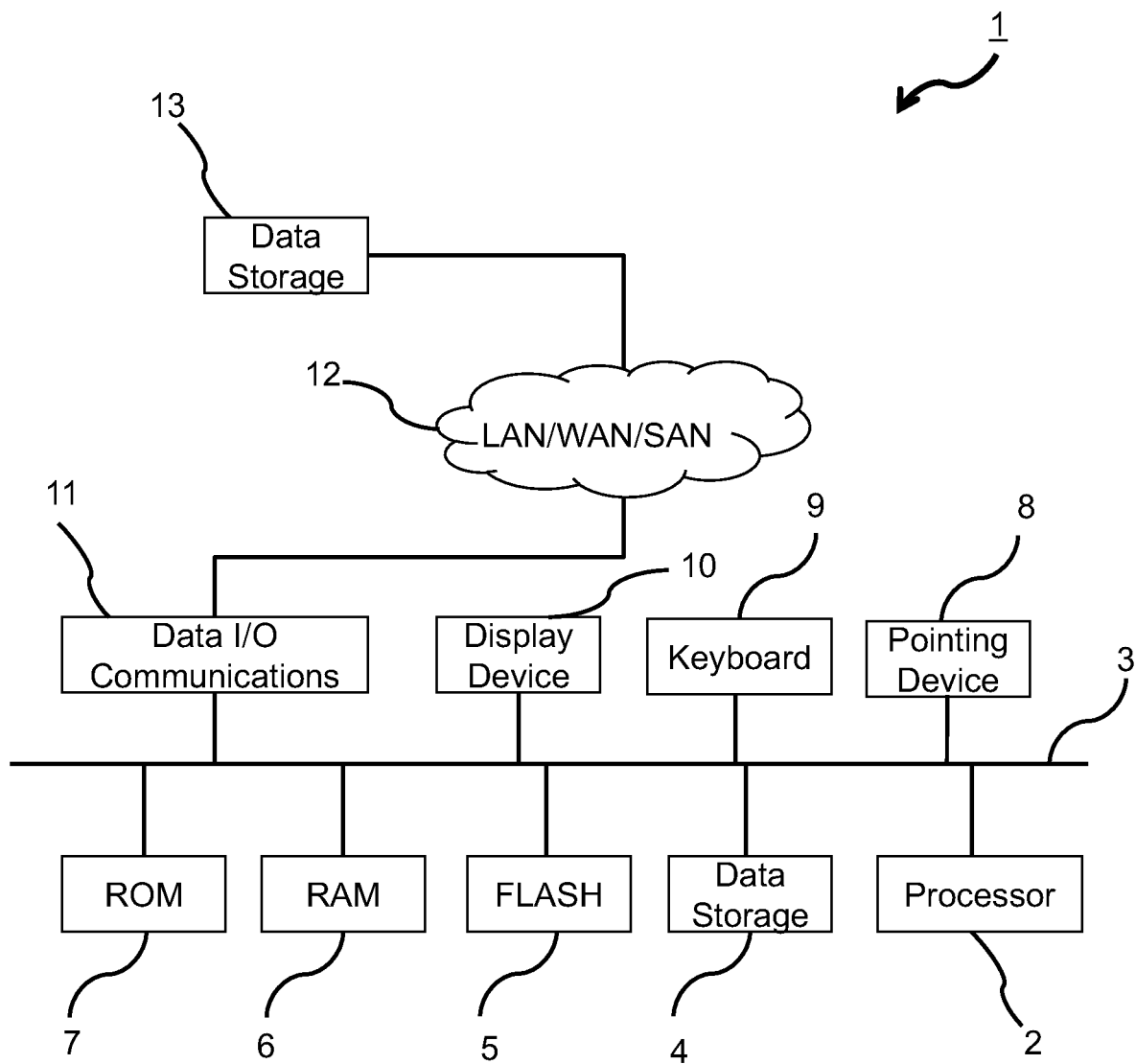
FIG. 1 illustrates an example data processing system adapted to implement the methods described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below may provide a computer implemented method for discovering a software product in a corporate data processing system. This may have a benefit that information about software that is used in a corporate data processing system, e.g., of a company, may be gathered at one central point.

Discovering a software product as used herein in particular means, determining automatically, or, at least, essentially automatically, whether and which software products are installed, stored or being executed on a system of interest.

The method may further comprise connecting a first computer to a knowledge database, the knowledge database comprising at least one software product indicating identifier that is adapted to identify a software product. This may have an advantage in that the first computer may be informed about software to be discovered via the knowledge database. The first computer may be a computer that is external to the corporate data processing system.

The method may further comprise selecting, by the first computer, from the knowledge database, one of the at least one software product indicating identifiers. This may have an advantage in that the first computer may receive an identifier, i.e., the software product indicating identifier or at least a part of it, and thus is informed as to what is about to search for in the corporate data processing system.

The method may further comprise connecting the first computer to the corporate data processing system. This may have an advantage in that the first computer may request the corporate data processing system for information and receive this information in order to further process this information with the aim of discovering what is inside the corporate data processing system.

The method may further comprise analyzing, by the first computer, the corporate data processing system for an occurrence of the software product indicating identifier in the corporate data processing system. This may have an advantage in that the first computer system may gain knowledge about which software product is installed, stored or being executed in the corporate data processing system.

The method may further comprise writing, by the first computer, a result of the step of analyzing to a list of discovered software products. This may have an advantage in that the first computer, thus, may store the discovered software products, or may store or at least mention the software products not discovered. A further advantage may be that, e.g., a user may be informed about software products used in the corporate data processing system.

This may have a further advantage in providing the list of discovered software products to an instance, that, e.g., may have to evaluate as to which software product is allowed to be executed in the corporate data processing system and which software product is not allowed to be executed in the corporate data processing system.

Corporate data processing system as used herein may refer to a corporate information factory that are known to the skilled person.

The knowledge database as used herein may comprise identifiers identifying software products and identifiers that are usually observable if a certain software product is executed on a computer system as well as a relation between these identifiers. For example, when, in the file system of a computer, files with the extension ".pdf" occur, one can be sure to a high degree that at least a reader for displaying files in a Portable Data Format might be installed and being executed on the computer of interest, i.e., the computer that is due to software discovery. Or, if a query for the processes running on the computer yields, e.g., besides a task number, a plain name of a software product, the plain name being identical to one of the identifiers in the knowledge base, it may be highly probable that this very software product is installed and is being executed on the computer of interest. What is said above with regard to a computer or computer system is of course transferrable to a corporate data processing system that is established by at least one computer.

According to embodiments, the method may comprise that, when an occurrence of the software product indicating identifier may be observed, if at least a part of the software product indicating identifier matches to an identifier found in the corporate data processing system. In other words, if an identifier from the knowledge database is found in the corporate data processing system, this may be taken as evidence or, at least, as a hint, that the software product related to the identifier is present in the corporate data processing system, or, occurs therein.

The term "matching" as used herein may refer to an identity relation, i.e., the software indicating identifier or part thereof is identical to the identifier found in the corporate data processing system. However, also a truncation may yield a matching relation. For example, when a part of the software product indicating identifier reads, e.g., "ABC-2.1*", the "*" denoting a truncation operator meaning "every character allowed", then, if an identifier "ABC-2.104" is found to occur in the corporate data processing system, the relation between "ABC-2.1*" and "ABC-2.104" may be determined to be in a matching relation. This may have an advantage in that many instances of files or processes of a software product being executed in the corporate data processing system may be observed. Thus, the method may come to the result that a software product indicated "ABC-2.104" indicated by the truncated software product indicating identifier "ABC-2.1*" actually occurs in the corporate data processing system. This may have an advantage in that finding an occurrence of a software product might be made easier concerning the administration of the knowledge base.

According to embodiments, the step of analyzing may comprise searching, in a metadata database of the corporate data processing system, for the occurrence of the software product indicating identifier. This may have an advantage in that the metadata database comprises many information about software installed or being executed on the corporate data processing system. Thus, it might be rendered comfortable to receive information as to which software is installed or being executed thereupon. In particular, as such metadata database might be prepared in advance to starting the presently described method, the method might be executable rapid and with a short response time.

According to an embodiment, the metadata database may comprise an identifier that is able to identify a software product that is installed, stored or executed in the corporate data processing system. This may have an advantage in that the first computer may, using the knowledge base, under relatively low latency, report an observation of a software product searched for. The skilled person is aware of, that the identifier needs not necessarily match to the name of the software product. As each software has its own way of marking, e.g., files that belong to it in order to distinguish these files from files belonging to other software products, such identifier may match to such strings as used by the software product to be searched for.

According to an embodiment, an agent process that is executed on the corporate data processing system may detect a change in the metadata database and may send a report about the change to the first computer. This may have an advantage in that the first computer needs not necessarily search in the metadata database over and over again, which would be also time consuming for the metadata database and, thus, might slower down the corporate data processing system. Merely, a database trigger might be installed on the metadata database, as is known to a skilled person, the database trigger being configured to inform the first computer about the change to the metadata database.

The term "occurs in the corporate data processing system", thus, may be related to, that the entity of interest, i.e., the software product indicating identifier or part thereof, is comprised in a metadata database or metadata repository of the corporate data processing system. However, the term "occurs in the corporate data processing system" may also be related to a process being executed on the computer or the computers or one of the computers establishing the corporate data processing system, when the file name of the executable file establishing the process matches the software product indicating identifier. Finally, the term "occurs in the corporate data processing system" may also be related to the software product indicating identifier or part thereof being comprised in a file name or in a file's content (e.g., in a header line).

According to an embodiment, the first computer, upon receiving the report of a change at the metadata database, may restart at least the step of analyzing. This may have an advantage in that the first computer may gain always actual information and may be able to keep the list of discovered software up to date.

According to an embodiment, the software product indicating identifier in the knowledge database may be a 3-tuple, comprising a keyword identifier that corresponds to a software product the occurrence of which is to be discovered in the corporate data processing system, a software product indicating identifier that represents the name of the software product, and a type identifier that represents a type of the occurrence of the software product in the corporate data processing system. This may have an advantage in that a relation between theses identifiers may be stored and kept retrievable.

According to an embodiment, the type identifier is at least one of a file type, a server name type, a process type, a database instance type, a database location type.

As an example, the type identifier may indicate "file type", the keyword identifier may indicate ".pdf", and the software product indicating identifier may indicate "PDF-Reader-X", then, if the discovery of the first computer on the corporate data processing system yields that there is a ".pdf"-file on the filesystem, the first computer might indicate something like "Occurrence of program <PDF-Reader-X> detected." Or, if the type identifier indicates "process type", the keyword identifier may indicate a name of an executable program and the associated software product indicating identifier indicates the name of the software product linked to the executable program, then, if, in a list of active processes within the corporate data processing system, the keyword identifier matches to an executable program found in the list of active processes, then it might be concluded that the associated software product may be installed on the corporate data processing system.

The skilled person understands that the corporate data processing system may be comprised by more than one computer that are connected to each other and will also understand how to perform steps of, e.g., establishing a list of active processes, may be achieved on a multiplicity of connected computers.

It is envisaged that such information may be stored in the metadata database.

According to an embodiment, the first computer is a licensing server. This may have an advantage in that a licensing server that is by design configured to check, e.g., number of licenses and an occurrence of licensed software and amounts of running instances, already is provided with the most important details of architecture and credentials, in order to implement the method disclosed herein with fewest amendments necessary. In other words, in order to establish the desired list of discovered software of the corporate data processing system, in particular, no or hardly any amendments to the corporate data processing system may be rendered necessary.

An advantage of the method described herein may be that, by comparing the list of discovered software products as discovered to a list of software product licenses paid or, more generally, a list specifying a compliance of software products, a result may emerge as to whether all software products used in the corporate data processing system are used in a compliant manner, or, whether software is licensed, i.e., is paid for, without using it. Thus, the owner of the corporate data processing system may gain knowledge about the overall situation of license related compliance therein.

According to an embodiment, the corporate data processing system comprises: a preparing component that is adapted to receive input information from an external database and adapted to process the input information to be appropriate for a processing within a central database; the central database; a resulting database that is adapted to hold output information that results from the processing of the input information; and a metadata repository.

In embodiments, the preparing component may fulfil one or more of tasks of extracting, transforming and loading (ETL), as will be understood by the skilled person. There might be a multiplicity of programs that are involved in the tasks of extracting, transforming and loading. An external database might by an ERP database, a CRM database, an MES database, a legacy database and/or a file system. The ETL may process the input information received from the external databases in order to achieve a homogenous data processing within the corporate data processing system. The central database of the corporate data processing system, also designated as corporate information factory, may be designated as data warehouse. The data warehouse may receive, by a user or implemented as script to be executed, instructions to organize parts of its data to be loaded into other databases within the corporate data processing systems. These other databases may be configured to hold the results of the instructions to organize parts of the data of the data warehouse, e.g., for answering specific questions concerning the company, its logistics, or similar.

According to an embodiment, the step of analyzing may comprise generating, initiated by the first computer, a list of process identifiers of processes being executed on a second computer that is comprised by the corporate data processing system, and searching in the list for the occurrence of the software product indicating identifier.

This may have an advantage, if the metadata database or metadata repository does not comprise such information, the first computer may on its own motion gather the processes being executed on a second computer that is comprised by the corporate data processing system, or, establishes it.

According to an embodiment, the step of analyzing may comprise, searching, in data files in the corporate data processing system that are arranged to be accessible by a second computer, for the occurrence of the software product indicating identifier. The corporate data processing system may be configured to be comprised by at least one second computer. In an alternative embodiment, the corporate data processing system may be established by a multiplicity of second computers that are connected to each other.

According to an aspect, a software discovering server for discovering a software product in a corporate data processing system is envisaged. This may have an advantage in that the server can be separately set up and be physically connected to a corporate data processing system. The software discovering server may be configured to implement one or more of the above described embodiments offering the advantages as described above.

In embodiments, the software discovering server may be established by a first computer and a knowledge database, the software discovering server comprising: means for connecting the first computer to the knowledge database, the knowledge database comprising at least one software product indicating identifier that is adapted to identify a software product; means for selecting, by the first computer, from the knowledge database, one of the at least one software product indicating identifiers; means for connecting the first computer to the corporate data processing system; means for analyzing, by the first computer, the corporate data processing system for an occurrence of the software product indicating identifier in the corporate data processing system; and means for writing, by the first computer, a result of the step of analyzing to a list of discovered software products.

According to an embodiment of the software discovering server, the knowledge database may be comprised by the software discovering server. This may have an advantage in that the software discovering server may have a high speed access to the knowledge database without any problems of an incompatibility of data types, syntax, etc.

According to an embodiment of the software discovering server, the knowledge database may be comprised by a third computer, remote to the software discovering server and remote to the corporate data processing system. This may have an advantage in that such knowledge database may be administrated from neutral parties, or, even bought as a separate product.

According to an aspect, a computer program product for discovering a software product in a corporate data processing system is envisaged. An advantage might be, that a computer program product may be provided to other companies offering benefits to several companies.

The computer program may comprise: a computer readable storage medium having computer usable code embodied therewith, wherein the computer readable storage medium is not a transitory signal per se, the computer usable program code comprising: computer usable code configured for performing one or more of the steps as already set forth upon describing the above method bearing the same advantages, that are, thus not repeated here.

The present method as described below may provide a computer implemented method of performing a software discovery, in particular a discovery of software products, based on metadata analysis. This may have a benefit that information about software that is used in a company may be gathered at one central point, namely, e.g., a metadata repository.

As used herein, the term central database may denote a database that may be implemented, in embodiments, as a data warehouse with a corporate data processing system. Further, as used herein, the term corporate data processing system may denote a cooperating system of components and processes having the central database as its very center. In embodiments, the corporate data processing system might be implemented to provide the features of what is commonly referred to as Corporation Information Factory, i.e., process all information that is associated with any business process executed in the company. In other words, the corporate data processing system, as used herein, might be described by an architecture of a Corporation Information Factory (CIF). Further, as used herein, the term data source may refer to the more specific databases within a company's context.

The method may further comprise establishing a metadata repository, based on the data in the corporate data processing system. This may have an advantage that metadata is stored at a central place for easy access. The term metadata as used herein may comprise the metadata of the data sources and, as well, any metadata that occurs during the execution of the described method. Establishing the metadata repository may, in embodiments, comprise gathering data from all systems that should be analyzed. As a result, the thus established Metadata Repository may hold information about all data that is processed in all of the processes being executed in the corporate data processing system.

The Metadata Repository, thus, may comprise information about type and location of all source databases and all information about the data therein, as for, e.g., database name, schema, tables, columns, type of data in the columns, etc. The metadata repository may further comprise information about processes that are actually being executed on the corporate data processing or one of its establishing computers.

A system that may transform data, e.g., an ETL system, from the data sources and load it towards the central database, may further generate information about the data processed, as for, e.g., mapping files, xml files having information about data changes, quality rules, etc. Such information may additionally be stored in the Metadata Repository. In the following, the term Metadata Repository will be written, in small letters, as metadata repository.

The method may further comprise analyzing the metadata repository. This may have an advantage in that information about any piece of data in the company may be collected and gathered. The step of analyzing the metadata repository, in particular, may enable the discovery of the source data, discovery of the processing of all of the data within the CIF, and, discovery of the final results systems, that may be implemented, in embodiments, as BI results.

As a result, the user has a system that may work on already prepared data (BI, data mining, OLAP, etc.). This may provide basis for generating further results, as for example BI report, tables, visualizations, data pipelines, etc. It is considered, in embodiments, that the information about such results may be stored in the metadata repository.

According to embodiments, the method may comprise discovering at least one of the data sources, a processing that is performed by the central database appliance, and a result of the processing, that may be BI results. As already described, discovering at least one of the data sources may be concerned with the metadata of the data sources. Discovering the processing that is performed by the central database appliance may be related to data and metadata that arise upon the execution within the corporate information factory. And, discovering the results of the processing, may gain further information about which results have already been achieved.

According to embodiments, the software discovery may be performed by a licensing component. The licensing component may, in embodiments, be implemented as a licensing server. The licensing server may be appointed to watch and/or discover as to whether the license conditions governing the use of a program are obeyed to. Thus, the license server may be arranged to monitor compliance requirements. For example, in the case a specific program may be used by, e.g., 15 users, such license server might watch as to whether this prerequisite is fulfilled, and, in the case such prerequisite is not fulfilled, the license server might issue a warning. This was a rather simple example. The skilled person is well aware of much more complex prerequisite settings that might necessarily be monitored in order to fulfil compliance requirements. Embodiments may have an advantage in that only a small amendment is necessary to be applied to an arbitrary corporate data processing system, because, usually, a license server might already be existent and have necessarily access to meta information about all programs, so that an implementation of the present method may be put into practice with very little effort.

According to embodiments, the central database appliance may comprise at least one of a central database, one or more components, that may be ETL components, for preparing information from one or more of the peripheral databases, and one or more resulting databases, that may be data marts. This may have an advantage that all the data of all of the data sources may be normalized, in order, e.g., to be comparable, and may be provided to fulfil the specific needs of specific data marts.

According to embodiments, the one or more components may comprise at least one of a data validation, a data cleaning, a data transforming, a data aggregating, and a loading. This may have an advantage that all data within the central database will be valid, normalized (cleaned), transformed and, where necessary, aggregated, so that only valid, normalized and comparable data sets are stored in the central database.

According to embodiments, the resulting databases; that may result from specific queries sent to the central database; may be based on the central database or data warehouse of the corporate data processing system, the resulting databases providing specific parts of the central database, the specific parts serving specific purposes. Thus, the resulting databases, or, data marts, may gain specific insight under a specific question of all data in the company.

According to embodiments, the data sources may be at least one of an ERP database, a CRM database, an MES database, a legacy database, and a files database. As a matter of fact, a files database may usually be the file system itself—however, it is considered to describe and/or access files via database tables that are not necessarily relationally organized.

According to embodiments, the method may further comprise, in an initial stage of discovery, creating a connection between the metadata repository and a licensing component. As used herein and for the purpose of this disclosure, the terms metadata repository, metadata database and metadata server may be used equivalently. It is to be understood that an initial stage of discovery might be performed only once, that is, when the method disclosed herein is implemented into a running system, e.g., a running CIF. Such initial stage, or, initial run, might be relatively time consuming.

The method may further comprise performing a full scan of data in the metadata repository. This may have an advantage that the licensing server may receive information about all incurred metadata in the whole company.

The method may further comprise reporting found software to a user. This may have the effect that the user may gain the desired overview over, e.g., all of the data used in the company, where it is located and what it is used for.

According to embodiments, the method may further comprise, in a monitoring stage of discovery, monitoring changes in the metadata repository. This may have an advantage that the results of the initial run, once it has been executed, may be used, and only differences are monitored. Thus, the monitoring stage of discovery or the monitoring run may be performed much faster than the initial run.

The method may further comprise, in the case, no new data is found, repeating the step of monitoring changes. In other words, a loop may be performed, checking, as to whether a change has occurred, and upon the result of this checking, taking the appropriate action.

According to an embodiment, the result of the processing may be at least one of OLAP, data mining, data visualization, and reports.

In other words, envisaged is a system for identifying a software component, the software component being operable for accessing a data element of a corporate information factory, the corporate information factory comprising a data warehouse operable for storing the data element and a metadata repository operable for storing at least one metadata element, the metadata element being related to the data element, wherein the system comprises a software identification device operable for retrieving the metadata element from the metadata repository; analyzing the metadata element; and based on the analyzing, identifying the software component that is likely to access the data element related to the metadata element.

Within such system, the data element may comprise a database and the analyzing may comprise determining at least one database property, the database property including at least one of a name of the database, a schema of the database, a set of tables present in the database, or a description of a column type of at least one table of the database.

Further, the analyzing may comprise determining a file type.

Further, the system may comprise a knowledge base, the knowledge base being operable for storing a relation between characteristics of the metadata element and an identifier of the software component to be identified.

Further, the characteristics of the metadata element may include at least one of the database property or the file type.

Further, the system comprises a license server operable for calculating at least one license metrics based on a set of software components identified by the identification device.

Further envisaged is a method for identifying a software component, the method performing the steps as indicated in the description of the aforementioned system.

The present invention may be a system, a method, and/or a computer program product at any possible technical detail level of integration. The computer program product may include a computer readable storage medium (or media) having computer readable program instructions thereon for causing a processor to carry out aspects of the present invention.

Further envisaged is a computer program product, comprising a computer readable storage medium having computer usable code embodied therewith, wherein the computer readable storage medium is not a transitory signal per se, the computer usable program code comprising computer usable code configured for performing the steps as indicated in the description of the aforementioned system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The skilled person knows that a database is not a server and is not a data repository. However, no database can be used without it being implemented on a server apparatus. Also, a data repository, in the case it is hold on a computer on its own, will need server software infrastructure to be accessible by applications. Thus, for the purpose of the present disclosure, the term database will always mean to imply server software infrastructure, as well as the term repository may mean to imply server software infrastructure. In particular, the term metadata repository may be equivalent to the term metadata server.

A block diagram illustrating an example computer processing system adapted to implement the methods of the present invention is shown in FIG. 1. The computer system, generally referenced 1, comprises a processor 2 which may comprise a digital signal processor (DSP), central processing unit (CPU), microcontroller, microprocessor, microcomputer, ASIC or FPGA core. The system also comprises static read only memory 7 and dynamic main memory 6 and may also comprise a FLASH memory 5. The processor 2 is via a bus 3 in communication with any of said memory devices as well as with peripheral devices such as a display device 10, a keyboard 9, a pointing device 8, such as, e.g., a mouse or a tablet.

The computer system is connected to one or more external networks such as a LAN or WAN or SAN 12 via communications lines connected to the system via one or more data I/O communication interfaces 11, e.g., a network interface 11. The network adapters 11 coupled to the system enable the data processing system to become coupled to other data processing systems or remote printers or storage devices through intervening public or private networks.

For example, in embodiments, a first computer that may be arranged as the data processing system as described with respect to FIG. 1, and a corporate data processing system that may be arranged as the data processing system as described with respect to FIG. 1 may be connected to each other so that the first computer can gain insight into the corporate data processing system. The corporate data processing system itself may be established by a multiplicity of second computers communicatively coupled to each other, each arranged as the data processing system as described with respect to FIG. 1, cooperating with one or more databases.

Modem, cable modem and Ethernet cards are just a few of the currently available types of network adapters. The system comprises also a magnetic or semiconductor based data storage or storage device 4 and/or 13 for storing application programs and data. The system comprises computer readable storage medium that may include any suitable memory means, including but not limited to, magnetic storage, optical storage, semiconductor volatile or nonvolatile memory or any other memory storage device.

In an exemplary embodiment it is envisaged that the computer system that the user uses to communicate with the computer system that executes the method of present invention is a client computer system as depicted above. In another exemplary embodiment it is envisaged that the computer system that executes the method of present invention essentially is structured comparable, however, in detail, is structured as illustrated below.

Figure 2:
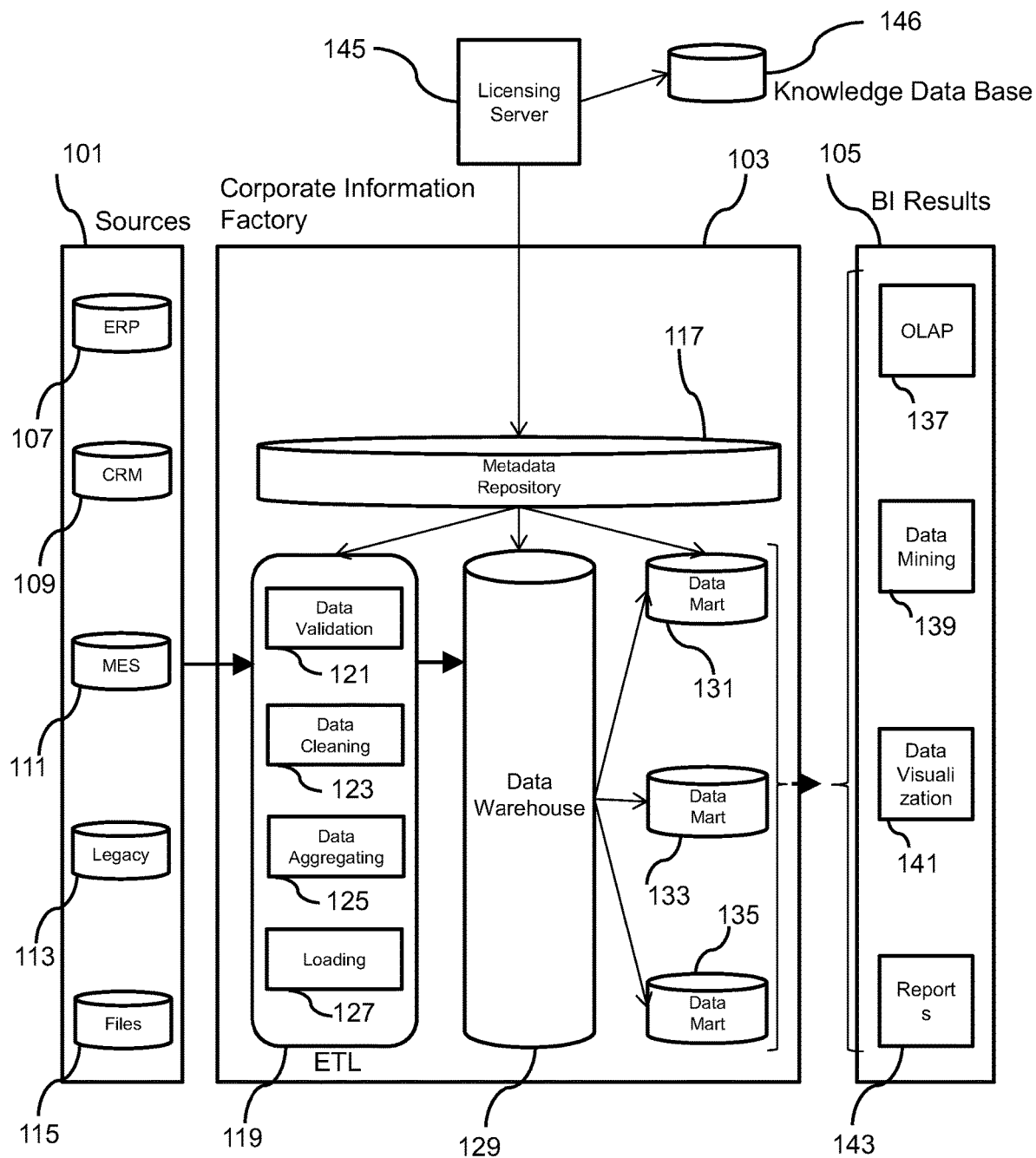
FIG. 2 illustrates an architecture of cooperating components.

FIG. 2 illustrates a system, respectively an architecture of cooperating components as suggested herein.

At reference numeral 101, data sources 101 are provided to load data towards a corporate data processing system 103 that may be a corporate information factory 103. Results of the processing of the corporate data processing system, i.e., the result of the work of business intelligence, may be provided at BI results 105.

The data sources 101 may comprise at least one of an ERP database 107, a CRM database 109, an MES database 111, one or more legacy databases 113, and, files or file databases 115. The skilled person will be aware that a database may be simple table or be structured as a relational database.

The corporate data processing system 103 may comprise a central database 129, that may be denoted as a data warehouse 129. The central database receives its input data from an ETL component 119. The ETL component may comprise a data validation subsystem 121, a data cleaning subsystem 123, a data aggregating subsystem 125, and, a loading subsystem 127. The ETL component 119 is configured to order the data of the very different data sources 107 through 115 so that it may be easier processable by the corporate data processing system 103.

The output of the central database 129, being triggered by specific requests, may be, dependent on the search criteria of the request and the searching stakeholder of the request, one or more data marts 131, 133, 135.

Finally, the results may be prepared to be BI results and yield contributions towards an OLAP component 137, a data mining component 139, a data visualization component 141, and a reports component 143.

Each of the aforementioned components of the corporate data processing system 103 contains data or is deeply concerned with data, implying the presence of related metadata. All of the metadata used therein may be gathered from the metadata repository 117.

According to embodiments, further, a first computer 145 or a licensing server 145 may be provided. The licensing server 145 may be configured to analyze the metadata repository 117. The licensing server 145 may be configured to connect to a knowledge database 146. An example of a content of the knowledge database 146 is given below with respect to the example table. The knowledge database 146 may comprise at least, e.g., a software product indicating identifier. Such software indicating identifier may be, in embodiments, a string as is known from program languages.

One of those strings may be selected by the licensing server before connecting to the metadata repository of the corporate data processing system 103.

The licensing server may connect to the corporate data processing system 103, in particular, it may connect to its metadata repository 117. Then, the licensing server 145 might search for occurrences of the string in the metadata repository 117. In embodiments, the licensing server 145 may write all occurrences of the string into a list of discovered software products, the list not being shown on the figure.

To summarize, the architecture as depicted in FIG. 2 shows an arrangement on which a computer implemented method for discovering a software product in a corporate data processing system 103 may be implemented, the method comprising: connecting a first computer 145 to a knowledge database 146, the knowledge database 146 comprising at least one software product indicating identifier (e.g., "keyword") that is adapted to identify a software product; selecting, by the first computer 145, from the knowledge database 146, one of the at least one software product indicating identifiers; connecting the first computer 145 to the corporate data processing system 103, e.g., to a metadata repository 117 arranged therein; analyzing, by the first computer 145, the corporate data processing system 103 for an occurrence of the software product indicating identifier in the corporate data processing system 103; writing, by the first computer 145, a result of the step of analyzing to a list of discovered software products.

Figure 3:
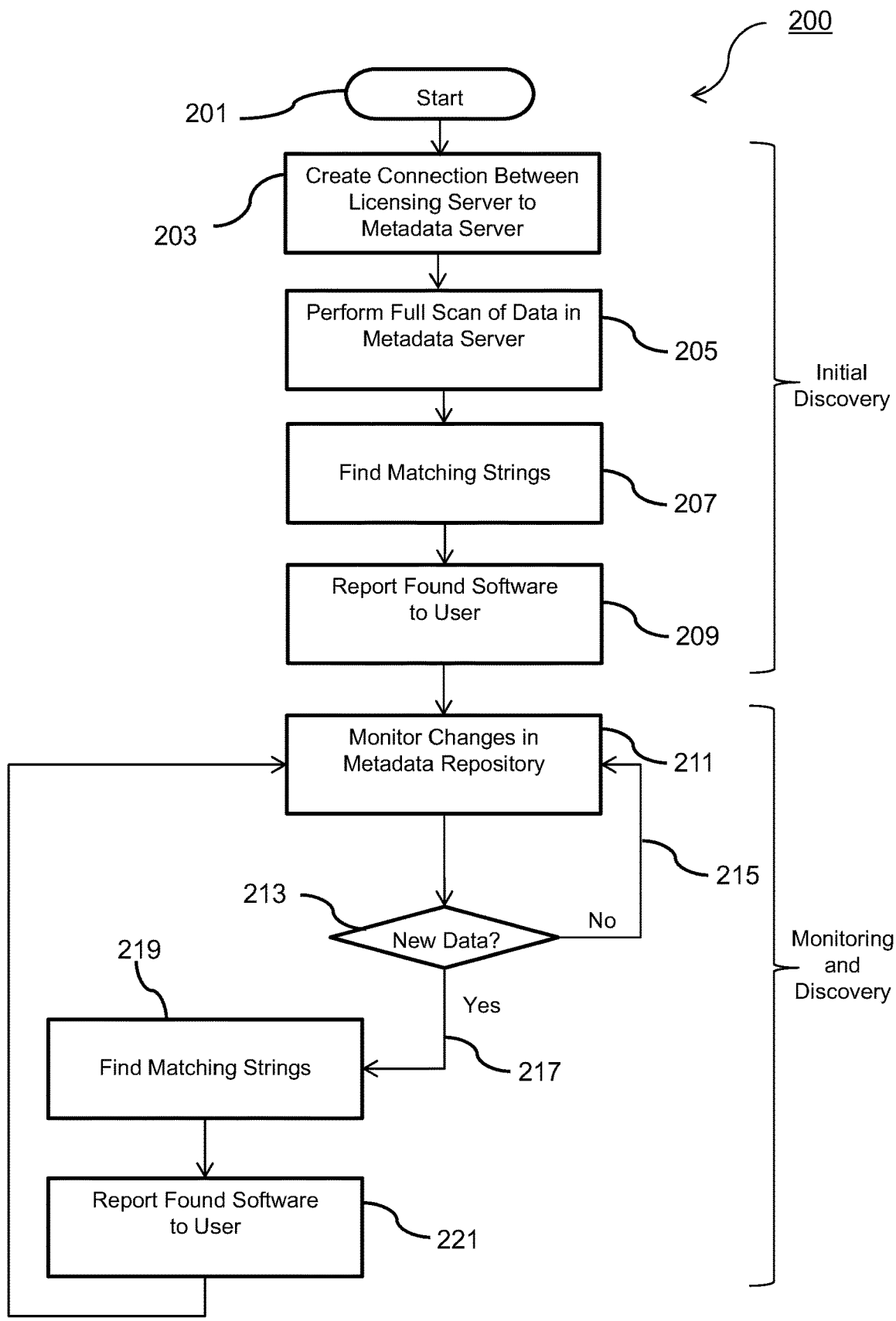
FIG. 3 illustrates an exemplary flowchart of the method set forth herein.

FIG. 3 illustrates a flowchart showing embodiments of a method that the licensing server may be configured to execute.

The method 200 may be regarded as roughly being divided into two parts: an initial discovery stage and a monitoring and discovery stage.

The method starts with reference numeral 201, start 201. Subsequently, at 203, a connection may be created between the licensing server 145 and the metadata repository 117. As well, a connection may be created between the licensing server 145 and the knowledge base 146. Further, the licensing server 145 will select a software product indicating identifier from the knowledge base 146.

In step 205, the licensing server 145 may perform a full scan of data in the metadata server 117. This may mean, that the licensing server 145 compares all entries in the metadata repository 117 to the selected software product indicating identifier. This may also mean that the licensing server 145 compares all entries in the metadata repository 117 to all software product indicating identifier that can be found in the knowledge database. In other words, in step 207, the licensing server 145 may search for and find matching strings.

In step 209, in particular embodiments, the licensing server may report found software to a user. Alternatively, the licensing server is envisaged to gather all found software product names into a list of discovered software. Supplementarily, the licensing server is envisaged, in a case wherein one software product indicating identifier indicates two different software product names, that a user may be prompted to solve such ambiguity manually.

The aforementioned steps may be performed in the stage of the initial discovery, that means, when the licensing server, having the method of the present disclosure implemented, is connected for the first time to the corporate data processing system 103.

Subsequently, the monitoring and discovery stage may begin.

The first step of the monitoring and discovery stage, step 211, may denote monitoring changes in the metadata repository 117.

In step 213, it is checked as to whether there is new data in the metadata repository 117. If there is no new data in the metadata repository 117, the method may branch, 215, to again monitor, 211, changes in the metadata repository 117.

The aforementioned steps of monitoring 211, checking 213 and branching back, 215, to step 211, may be executed by an agent software that is executed on the corporate data processing system 103. For example, such software may be implemented by the mechanism of a database trigger, as known in the art, applied to the metadata database 117. Such trigger may be configured to inform the licensing server 145 each time, a change is performed on the metadata database 117.

In the case, an occurrence of new data is detected in decision step 213, the method may branch, 217, "Yes", to step 219 and again search for and perhaps find matching strings.

The thus discovered software may be reported, 221, to the user.

This illustration is for explanation purpose only. The skilled person will understand, that method steps 207 and 219 might be implemented as invoking a functionality of finding matching strings, i.e., comparing a software product indicating identifier from the knowledge database 146 to a metadata identifier from the metadata repository 117, without a necessity to have the same code twice. The same holds true for the steps 209 and 221 that might also be implemented to be only a call to a corresponding functionality, which is implemented only once.

The above method may look, during string matching 207 or 219, for certain keywords that are located in a knowledge base that may be implemented, e.g., on the licensing server or on a server of a vendor of the licensing server, to which the licensing server is connecting.

An example structure of such a knowledge base might look like the table shown below.

The column "Product" may hold software product names, the column "Keyword" may hold software product indicating identifiers, the column "Type" may hold a type identifier, the type identifier being at least one of a file type, a server name type, a process type, a database instance type, a database location type.

As shown below in the example, the knowledge database comprises multiple lines of software product indicating identifiers. A part thereof, i.e., a part of the software product indicating identifier, i.e., in the example herein, the column denoted "keyword", may comprise the identifier that is used to be compared to identifiers stored in the metadata database.

Following the example below, when the licensing server 145 reads, from the knowledge base 146, the keyword "DataStage" with the type "Software_name", then, the licensing server 145 may search in the metadata repository 117 or in a process table of processes being actually executed within the whole of the corporate data processing system 103, for the occurrence of the identifier "DataStage". When, eventually, the licensing server 145 finds a match, it may report "Product 'IBM DataStage' found." to the list of discovered software.

| Product | Keyword | Type |
|---|---|---|
| IBM DataStage | DataStage | Software_name |
| IBM DataStage | IIS | Server_name |
| IBM DataStage | /opt/IBM/InformationServer | Database_location |
| IBM DataStage, IBM Information Server | Xmeta | Database_name |

In another case, when the keyword reads "Xmeta" and the type reads "Database_name", the licensing server 145 might find two different software product name identifiers, as for, in the above example knowledge database, IBM DataStage and IBM Information Server. In such a case, a user might be prompted to manually gather additional information in order to get the list of discovered software correct. The corporate data processing system 103, for example the metadata repository 117, might add further information, for example an IP address of where the database instance is being executed upon. Thus, the user gets a hint as to which software product does the found keyword belong.

What is claimed is:

1. A method for discovering a software product in a corporate data processing system having a metadata repository using a licensing server, comprising:

connecting the licensing server to a knowledge database, wherein the licensing server controls number of licenses for at least one software product, and wherein the knowledge database comprising the at least one software product indicating identifier that is adapted to identify a software product;

selecting, by the licensing server, from the knowledge database, one of the at least one software product indicating identifiers;

connecting the licensing server to the metadata repository of the corporate data processing system, wherein the metadata repository holds information about data that is processed in all of the processes being executed in the corporate data processing system;

monitoring changes in the metadata repository;

analyzing, by the licensing server, the metadata repository for an occurrence of the software product indicating identifier in the corporate data processing system, wherein the analyzing comprises searching in the metadata repository of the corporate data processing system for the occurrence of the software product indicating identifier; and writing, by the licensing server, a result of the analyzing to a list of discovered software products.

2. The method of claim 1, wherein an occurrence of the software product indicating identifier is observed, if at least a part of the software product indicating identifier matches to an identifier found in the corporate data processing system.

3. The method of claim 1, wherein the metadata repository comprises an identifier that is able to identify a software product that is installed, stored or executed in the corporate data processing system.

4. The method of claim 1, wherein an agent process that is executed on the corporate data processing system detects a change in the metadata repository and sends a report about the change to the first computer.

5. The method of claim 4, wherein the first computer, upon receiving the report, restarts at least the analyzing.

6. The method of claim 1, wherein the software product indicating identifier in the knowledge database is a 3-tuple, comprising a keyword identifier that corresponds to a software product the occurrence of which is to be discovered in the corporate data processing system, a software product indicating identifier that represents the name of the software product, and a type identifier that represents a type of the occurrence of the software product in the corporate data processing system.

7. The method of claim 6, wherein the type identifier is at least one of a file type, a server name type, a process type, a database instance type, a database location type.

8. The method of claim 1, wherein the corporate data processing system comprises a preparing component that is adapted to receive input information from an external database and adapted to process the input information to be appropriate for a processing within a central database, the central database, a resulting database that is adapted to hold output information that results from the processing of the input information, and the metadata repository.

9. The method of claim 1, wherein analyzing comprises generating, initiated by the first computer, a list of process identifiers of processes being executed on a second computer that is comprised by the corporate data processing system, and searching in the list for the occurrence of the software product indicating identifier.

10. The method of claim 1, wherein the step of analyzing comprises, searching, in data files in the corporate data processing system arranged to be accessible by a second computer, for the occurrence of the software product indicating identifier.

11. A computer system for discovering a software product in a corporate data processing system having a metadata repository using a licensing server, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

connecting the licensing server to a knowledge database, wherein the licensing server controls number of licenses for at least one software product, and wherein the knowledge database comprising the at least one software product indicating identifier that is adapted to identify a software product;

selecting, by the licensing server, from the knowledge database, one of the at least one software product indicating identifiers;

connecting the licensing server computer to the metadata repository of the corporate data processing system, wherein the metadata repository holds information about data that is processed in all of the processes being executed in the corporate data processing system;

monitoring changes in the metadata repository;

analyzing, by the licensing server, the metadata repository for an occurrence of the software product indicating identifier in the corporate data processing system, wherein the analyzing comprises searching in the metadata repository of the corporate data processing system for the occurrence of the software product indicating identifier; and writing, by the licensing server, a result of the analyzing to a list of discovered software products.

12. The computer system of claim 11, wherein the knowledge database comprises by a third computer, remote to the software discovering server and remote to the corporate data processing system.

13. A computer program product for discovering a software product in a corporate data processing system having a metadata repository using a licensing server, the computer program comprising:

one or more computer-readable storage media and program instructions stored on at least one of the one or more tangible storage media, the program instructions executable by a processor to cause the processor to perform a method comprising:

connecting the licensing server to a knowledge database, wherein the licensing server controls number of licenses for at least one software product, and wherein the knowledge database comprising the at least one software product indicating identifier that is adapted to identify a software product;

selecting, by the licensing server, from the knowledge database, one of the at least one software product indicating identifiers;

connecting the licensing server to the metadata repository of the corporate data processing system, wherein the metadata repository holds information about data that is processed in all of the processes being executed in the corporate data processing system;

monitoring changes in the metadata repository;

analyzing, by the licensing server, the metadata repository for an occurrence of the software product indicating identifier in the corporate data processing system, wherein the analyzing comprises searching in the metadata repository of the corporate data processing system for the occurrence of the software product indicating identifier; and writing, by the licensing server, a result of the analyzing to a list of discovered software products.

14. The computer program product of claim 13, further comprises:

searching in a metadata repository of the corporate data processing system for the occurrence of the software product indicating identifier.

15. The computer program product of claim 14, wherein the metadata repository comprises an identifier that is able to identify a software product that is installed, stored or executed in the corporate data processing system.

16. The computer program product of claim 14, further comprising:
   restarting at least the computer usable code configured for the analyzing, upon receiving a report about a change in the metadata repository, from an agent process that is executed on the corporate data processing system.

17. The computer program product of claim 14, wherein analyzing comprises generating, initiated by the first computer, a list of process identifiers of processes being executed on a second computer that is comprised by the corporate data processing system, and searching in the list for the occurrence of the software product indicating identifier.

\* \* \* \* \*